March 18, 1969 R. A. GANGE 3,434,121

CRYOELECTRIC MEMORY SYSTEM

Filed June 10, 1966 Sheet 1 of 3

INVENTOR.
ROBERT A. GANGE
BY
Attorney

INVENTOR.
ROBERT A. GANGE
BY [signature]
Attorney

INVENTOR.
ROBERT A. GANGE
BY Samuel Cohen
Attorney

United States Patent Office 3,434,121
Patented Mar. 18, 1969

3,434,121

CRYOELECTRIC MEMORY SYSTEM

Robert A. Gange, Belle Mead, N.J., assignor to Radio Corporation of America, a corporation of Delaware Filed June 10, 1966, Ser. No. 556,664
U.S. Cl. 340—173.1 7 Claims
Int. Cl. G11b 9/00

This invention relates to a new and improved cryoelectric memory system.

The system includes two sets of drive lines, namely the *a* and *b* lines and a plurality of memory planes. Each set of *b* lines passes back and forth many times over only a single memory plane. Each *a* line passes over a plurality of memory planes and the plurality of crossovers, hereafter termed "intersections" of an *a* line with a single *b* line on a single plane define a plurality of memory locations for the bits of a single word. Each memory plane also includes plurality of superconductor loops which store persistent currents, one such loop at each memory location. Loops on a plane which store bits of the same significance are connected in series and each set of series-connected loops acts as a sense winding. The sense windings for the bits of the same significance on a plurality of different planes are coupled through an OR gate to a sense amplifier.

Aside from the organization above, which is in itself new, in the memory of the invention the memory address decoders are separate from the memory planes and may be maintained at room temperature. This feature, as well as the organization, provides important operating advantages, as will be discussed in more detail later.

The invention is discussed in greater detail below and is shown in the following drawings of which:

In the discussion which follows, a cryogenic environment for the memory planes and certain other components is assumed. This may be achieved by immersing the memory planes in a liquid helium bath as is well understood in the art.

Figures 1, 5:
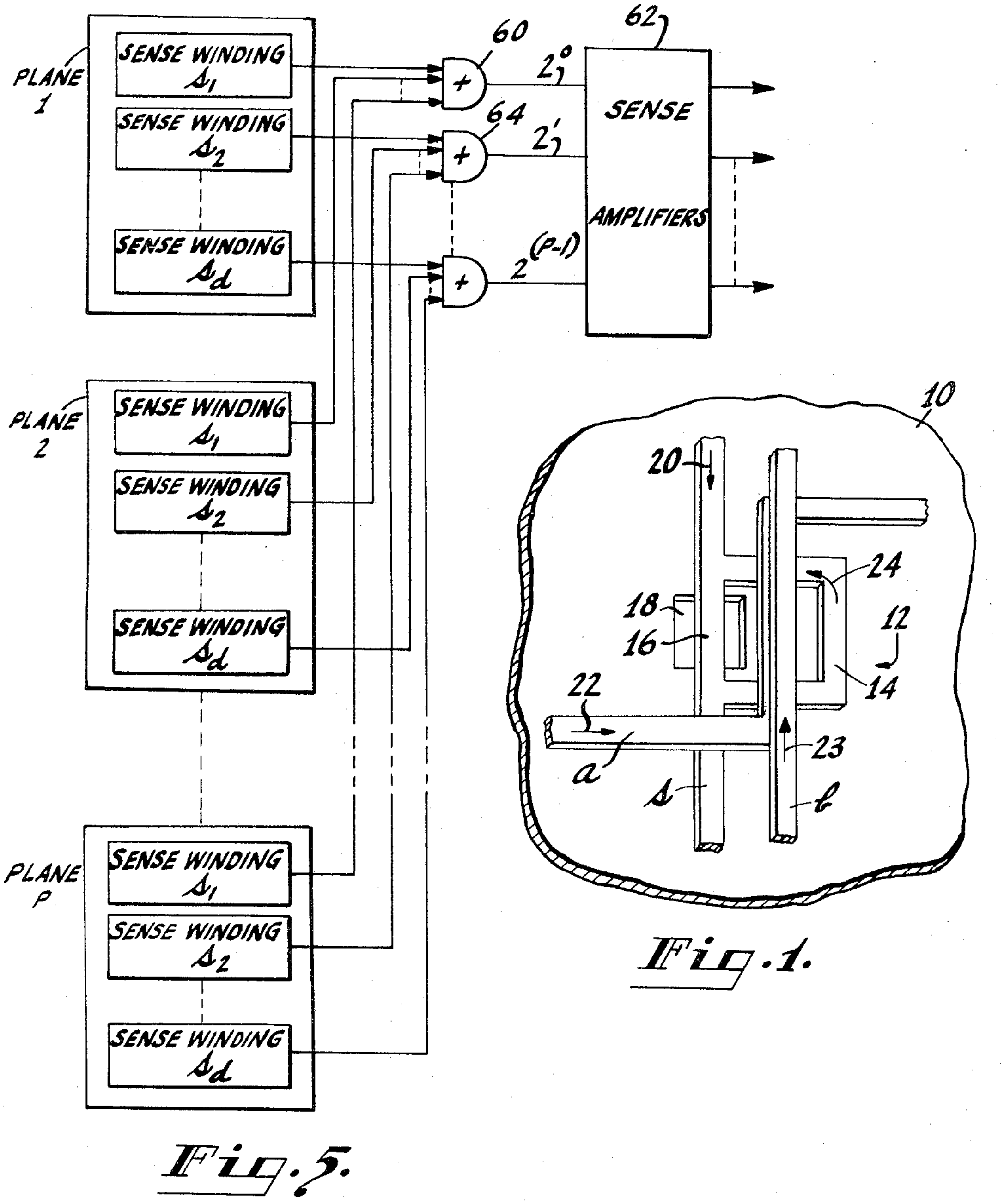
FIGURE 1 is a perspective, schematic showing of a single memory element which may be employed in the system of the invention.
FIGURE 5 is a schematic showing of the sense circuit of the present invention.

The memory element of FIGURE 1 includes a ground plane 10 which may be formed of a superconductor such as lead and a sense line *s* formed of a superconductor such as tin. The sense line includes a loop 12 which has two parallel current paths 14 and 16. The path 16 is located over a hole 18 in the ground plane. There are two drive lines *a* and *b*, formed of superconductors such as lead, which pass over the loop. These lines are insulated from one another, from the ground plane, and from the sense line *s* and loop 14, 16. The loop is also insulated from the ground plane 10. The insulation may be a thin-film of silicon monoxide or the like, however, for the sake of drawing clarity, the insulation is not shown.

To write information into the memory cell of FIGURE 1, current is applied to the sense line *s*. If this current is applied in the direction of arrow 20, for example, the major portion of the current tends to flow in leg 14 of the loop rather than leg 16, as leg 16 exhibits greater inductance than leg 14. This greater inductance is achieved by the absence of the ground plane beneath leg 16.

If now drive currents, in the direction of arrows 22 and 23, are applied to the drive windings *a* and *b*, respectively, the magnetic fields produced by these drive currents are additive in the region where the two lines "intersect," that is, where they lie over one another. The current amplitudes are so chosen that the presence of a single drive current does not affect the superconducting state of the tin line or the loop 12. However, when both drive currents are present, the combined magnetic field produced by the two lines is sufficient to drive the two portions of tin loop 12 which lie beneath the *a* and *b* lines, to the normal (resistive) condition. When this occurs, the current 20 steers into leg 16 in preference to leg 14, as leg 16 is still a value of zero resistance.

If now the drive currents *a* and *b* are removed, the two portions of tin loop 12 will return to the superconducting state and the flux of the sense line current in path 16 will be trapped by loop 12. Subsequently, the write current indicated by 20 is removed, and the collapse of magnetic flux induces a current in loop 12. This current is persistent due to the zero resistance of loop 12, and is supported by the flux trapped therein. The persistent current will circulate around loop 12 in the counterclockwise direction, as indicated by arrow 24.

The data represented by the stored persistent current may be "read-out" of the loop by applying read currents to the *a* and *b* drive lines, as indicated by arrows 22 and 23, in the absence of current in the sense line. These drive the two portions of path 14 normal, again at the regions beneath the *a* and *b* drive lines. The current which decays through these normal areas causes a voltage to develop across the paths 14, 16 which may be detected as a sense voltage across the outer terminals of the sense line.

Figures 2, 3:
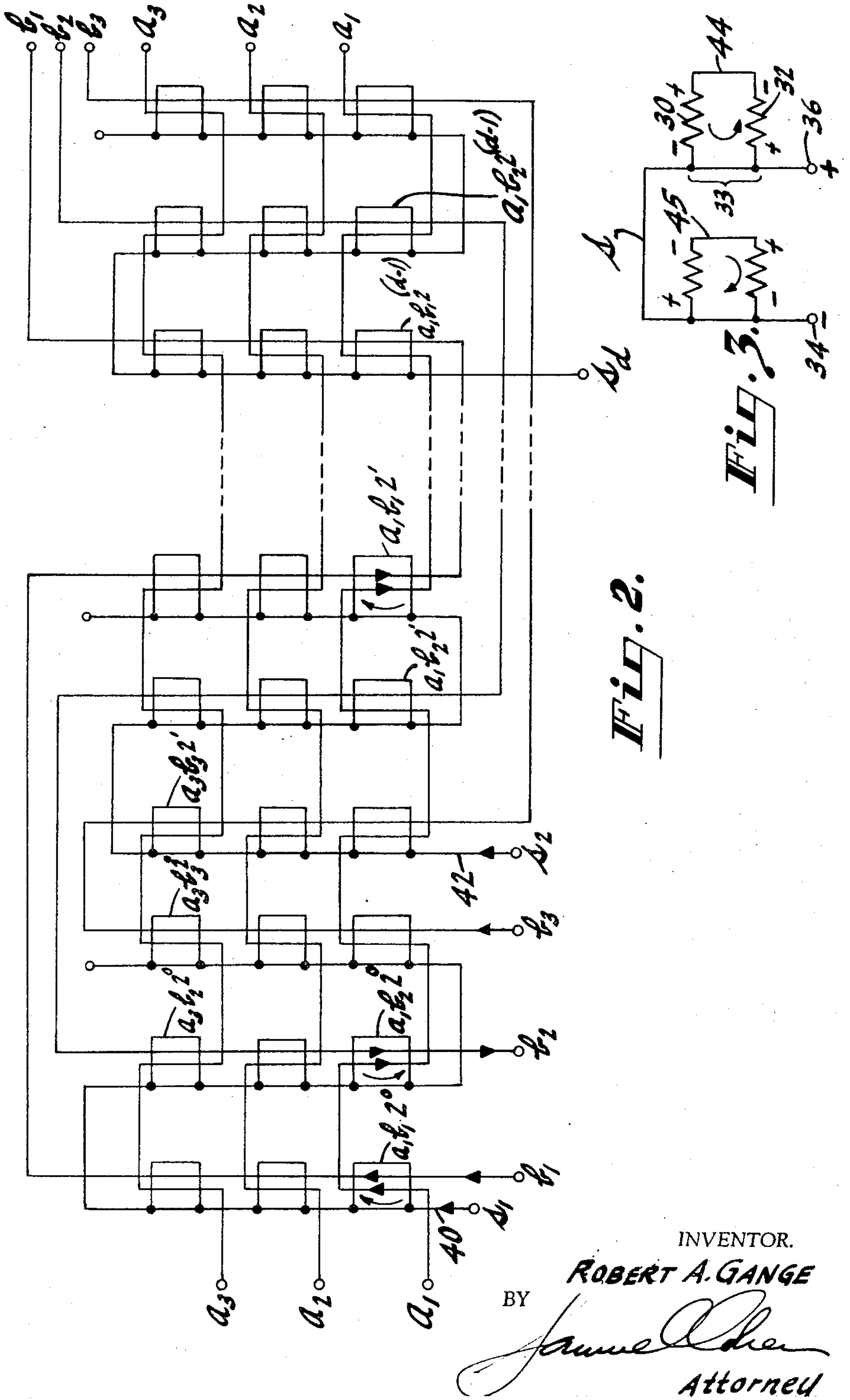
FIGURE 2 is a schematic diagram showing a portion of the memory plane organized in accordance with the present invention.
FIGURE 3 is an equivalent circuit to help explain the operation of the system of FIGURE 2.

The above is illustrated schematically in the right-hand loop of FIGURE 3. The resistors 30 and 32 represent the normal areas created when the coincident read currents are applied to the *a* and *b* lines (these lines are not shown in FIGURE 3). The sense voltage develops across these resistors in the polarity indicated. The portion 33 of the loop acts like an inductance and the sense voltage therefore appears across this inductance and across the terminals 34 and 36 of the sense line. This voltage is relatively positive at terminal 36 and relatively negative at terminal 34. (The second loop of FIGURE 3 may be ignored for the present. It will be discussed shortly in connection with the arrangement of FIGURE 2.)

The organization of a single plane of the memory, according to the present invcention, is shown in FIGURE 2. While in practice there may be upwards of hundreds of *a* lines and hundreds of *b* lines, for purposes of illustration only three *a* lines $a_1$, $a_2$, $a_3$ and three *b* lines $b_1$, $b_2$, $b_3$, are shown. Each set of *b* lines passes over only a single plane. Each *a* line passes over not only the single plane shown in FIGURE 2, but also over a plurality up to all the remaining planes in the system, as will be discussed shortly, in connection with FIGURE 4. In practice, there may be a stack of P planes where P is some large number such as 10, 50, 100 or more.

The intersections of a particular *a* line, with a *b* line on a single plane, define the memory locations which store the bits of a single word. A memory loop is located beneath each such intersection. While, in practice, each intersection consists of a *b* line lying directly over an *a* line (or vice-versa), for the sake of drawing clarity, these lines are shown side-by-side in FIGURE 2. The loops on a plane which store the bits of the same significance of the different words are connected in series and each set of series-connected loops acts as a sense line. For example, there is a set of nine such loops (for storage of nine $2^0$ bits, respectively) connected in series along the $s_1$ line, nine such loops (for storage of nine $2^1$ bits) connected in series along the $s_2$ line and so on. The $s_1$ lines on the different planes all may be connected to a single OR gate, as is discussed later in connection with FIGURE 5.

In the operation of the memory of FIGURE 2, assume that it is desired to write the word $a_1b_1$ on the plane shown in FIGURE 2. Assume that this word has the value 0 . . . 11. Current is applied in the direction of arrows 40 and 42 to the $s_1$ and $s_2$ lines, respectively, to represent the bits 1, 1, respectively, and no current is applied to the $s_d$ line, to represent the bit 0. Drive currents are applied to the drive lines $a_1$ and $b_1$, respectively. (The order in which the *a*, *b* and *s* currents arrive at a memory location is unimportant so long as they are all present at the same time.) Thereafter, the drive currents are removed and then the write currents applied to the *s* lines are removed. The result is the storage of persistent circulating currents in loops $a_1b_1\mathbf{2}^0$ and $a_1b_1\mathbf{2}^1$. The loop $a_1b_1\mathbf{2}^{(d-1)}$ which stores the most significant bit of the $a_1b_1$ word, is also driven normal by the $a_1$ and $b_1$ coincident drive currents, however, since no write current is applied to the sense winding $s_d$, a persistent current does not become established in loop $a_1b_1\mathbf{2}^{(d-1)}$. Note also that the persistent currents stored in loops $a_1b_1\mathbf{2}^0$ and $a_1b_1\mathbf{2}^1$ both circulate in the clockwise direction.

To read out the $a_1b_1$ word, coincident interrogation currents are applied to the drive lines $a_1$ and $b_1$. The result is sense voltages developed across the ends of leads $s_1$ and $s_2$ and no sense voltage developed across the ends of lead $s_d$. The sense voltages represent binary 1's and the absence of a sense voltage represents binary 0 so that the word 0 . . . 11 is read out of the memory.

If it is desired to write the $a_1b_2$ word into the memory, the same procedure as outlined above is followed for lines $a_1$ and $b_2$. The direction of the drive currents is indicated by the arrows on the respective lines. Note the direction of drive current $b_2$ is opposite from that of drive current $b_1$. Note also that at the respective memory locations, such as $a_1b_2\mathbf{2}^0$, the *a* and *b* drive currents produce additive magnetic fields. If there is a write current $s_1$ present during the application of the drive currents and the drive currents are removed, followed by the removal of the write current $s_1$, a persistent current is stored in loop $a_1b_2\mathbf{2}^0$, which current circulates in the counterclockwise direction. However, upon read-out, a voltage of the same polarity will develop as develops for loops storing a clockwise current, because the sense winding direction for the former loops is opposite that for the latter loops.

The above is illustrated in FIGURE 3. Note that the voltages developed across a loop which stores a clockwise persistent current, such as loop 45, causes a sense voltage to develop across terminals 34 and 36 which is relatively negative at terminal 34 and relatively positive at terminal 36. The persistent current stored in the second loop 44 circulates in the counterclockwise rather than the clockwise direction. However, when the loop is driven normal, the sense voltage which develops across terminals 34 and 36 is also relatively negative at terminal 34 and relatively positive at terminal 36.

Figure 4:
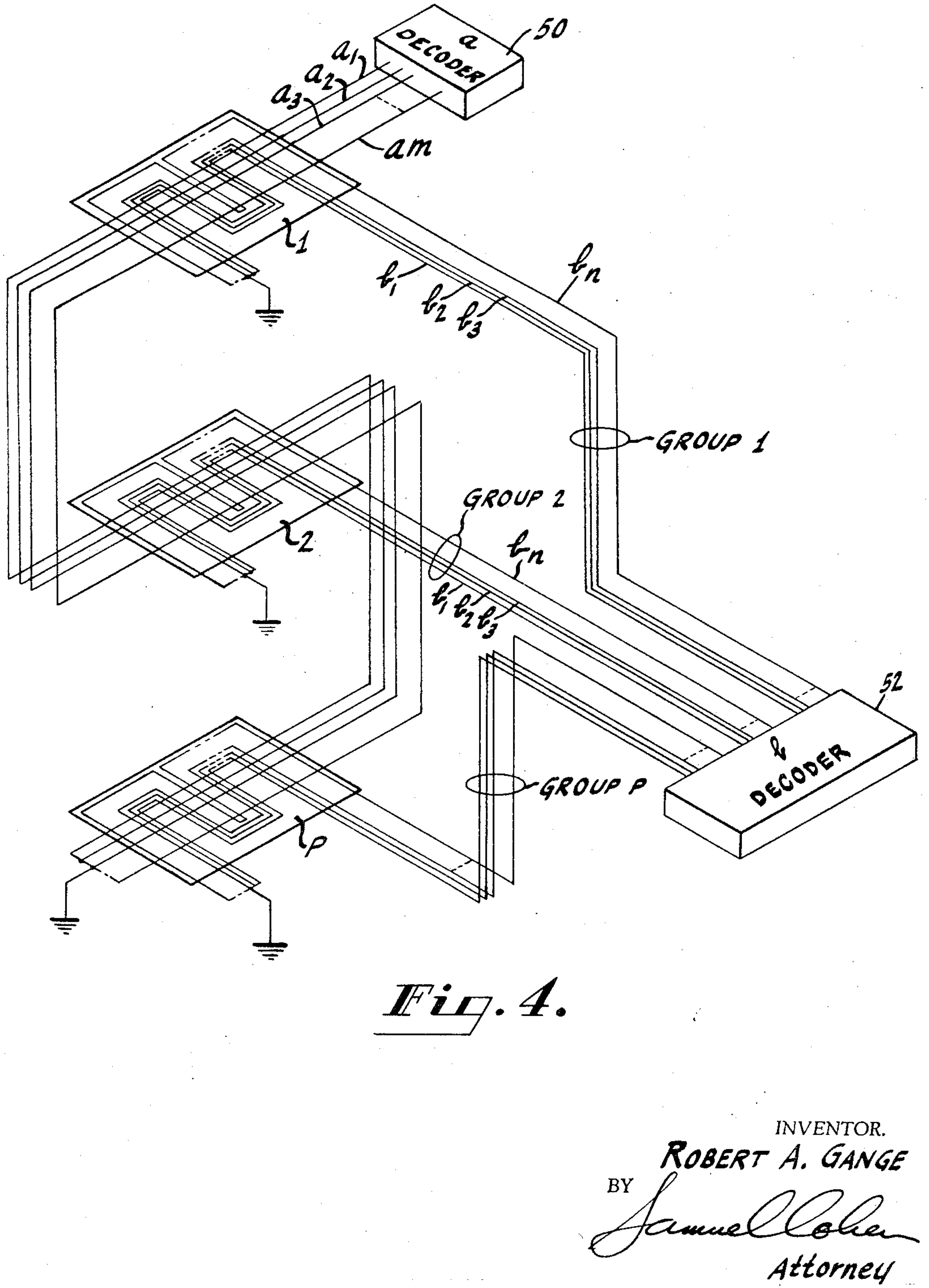
FIGURE 4 is an exploded, perspective view of a portion of the system of the invention.

The memory system of the invention is shown in part in FIGURE 4. The memory includes P planes of which planes 1, 2 and P are shown. There is a total of M *a* drive lines $a_1$, $a_2$ . . . $a_m$. While in practice these lines pass over the planes in the general manner shown in FIGURE 2, they are shown as straight lines in FIGURE 4, to simplify the drawing. Each line such as $a_1$ passes over all P planes. There are P groups of *b* drive lines, each such group of drive lines consisting of N lines $b_1$, $b_2$ . . . $b_n$. Each group of *b* lines passes back and forth many times over a single plane.

The *a* decoder of the system of FIGURE 4 is illustrated as a single block 50. The *b* decoder is shown as a single block 52. These decoders are at room temperature. Each decoder includes a current source and means for directing the current down a single one of the output lines. The latter may include groups of flip-flops which store an address and means for applying the outputs of these flip-flops, upon command from the control area of the computer, to a transistor matrix. The latter may be a square array or a pyramid tree or the like for directing the drive current down a single one of the drive lines.

As an example of the operation of the system of FIGURE 4, assume that it is desired to write to or read from the memory locations for word $a_3b_3$ on plane 2. The *a* decoder applies a current to drive line $a_3$ and the *b* decoder applies a current to drive line $b_3$ in group 2. At the same time, if the operation is a write operation, currents are applied to the sense windings (not shown in FIGURE 4) of plane 2, which correspond to the bits having the value 1 in the word it is desired to store.

The sense windings on the respective planes are shown schematically in FIGURE 5. The $s_1$ sense windings on all of the memory planes may be connected through a single OR gate 60 to one of the sense amplifiers in block 62. (Note that if there are more $s_1$ sense lines than a single OR gate can accommodate, several OR gates may be employed, each OR gate for a different group of $s_1$ lines.) The $s_2$ sense windings on all memory planes may be connected through a single OR gate 64 to another of the sense amplifiers in block 62, and so on. The output of OR gate 60 is a signal indicative of the least significant bit, that is, the $2^0$ bit of the word being read out of the memory. The output of OR gate 64 is indicative of the bit of next significance, that is, the $2^1$ bit of the word being read out, and so on. The output word produced by the sense amplifiers consists of signals indicative of a group of bits stored on a single memory plane, this group of bits comprising a single word.

Before discussing the important advantages of the present memory organization, a brief consideration of the prior art is in order. The article by L. L. Burns, titled, "Cryoelectric Memories," and published in the Proceedings of the IEEE, October 1964, pp. 1164–1176 should be referred to. The memory plane illustrated in FIGURE 3 of the article has $128 \times 128 = 16{,}348$ storage locations and the decoders, which are cryotron trees, are located on the same substrate as the memory plane. The zig-zag sense winding for the plane, shown in FIGURE 4 of the article, passes under each and every *x* and *y* drive line intersection. The sense winding is approximately 20 ft. long and imparts a signal delay of approximately 40 nanoseconds (page 1170, column 1).

A memory similar to the one illustrated in the article, but suitable for commercial use, would have a substantially larger number of storage locations on a memory plane and would include many such planes. It may be assumed, for purposes of the present discussion, that it is possible to make planes such as shown in the article, with $512 \times 512 \cong 2.5 \times 10^5$ memory locations per plane. Assume also that the memory consists of a stack of 100 planes to provide a total capacity of $25 \times 10^6$ bits. The word direction in a memory of this type is the *z* direction, that is, it is into the stack of planes. In other words, the first plane stores the $2^0$ bit of each word, the second plane the $2^1$ bit . . . the hundredth plane the $2^{99}$ bit. Each plane includes, at a minimum, 2044 cryotrons—1022 for the *x* selection tree and 1022 for the *y* selection tree. (It has been found, in practice, that great complexity of the cryotron tree than this is needed to increase the speed of the memory to a value such that it is competitive with other types of memories, however, this will not be considered further in this discussion.)

The memory above has the important advantage that a relatively small number of wires have to extend from a room temperature environment into the liquid helium. For example, there are two cryotron address wires per level of the cryotron trees. These address wires are connected in series within the helium to the separate memory planes. For the complete system, regardless of the number of planes, there will be 36 such wires needed. The other wires are similarly relatively small in number and it can be shown that the total number of wires needed is of the order of $10^3$. However, even though there is a relatively small number of wires, many of these wires must carry current simultaneously and accordingly there is substantial heat developed as a result of both $I^2R$ losses and conduction of heat. The refrigerator which would be needed for a memory of this size is quite large and, in fact, is unavailable commercially at the present time.

The maximum packing density which is possible for a cryoelectric memory is determined by the minimum amplitude of the sense signal which is generated compared to the noise which is generated. Taking these factors and others into consideration, calculations have shown that a packing density of about 10,000 cells per square inch is obtainable.

The size of the substrate which it is possible to employ depends, among other things, upon the state of development of the photoetching art. Without giving details or figures here, it has been determined that a substrate of about 6 inches on a side (36 square inches in area) is possible. Multiplying the substrate size by packing density gives the total number of bits per plane which it is possible to achieve, and this is $36\times10^4=3.6\times10^5$. With suitable allowance for tabs, margins, and a certain number of "redundant" drive and sense lines, the figure of $2.5\times10^5$ given above is reasonable for the system of the present invention using *a* and *b* drive lines, as already discussed. This is because each memory plane consists essentially entirely of memory storage loops. However, in the assumed memory of the prior art, it is necessary to include, in addition to the memory locations the *x* and *y* cryotron decoder trees. Accordingly, the bit capacity per plane is substantially smaller than it is possible to achieve with the memory organization of the invention.

In the assumed memory of the prior art, the zig-zag sense line on each plane (a plane assumed to have $2.5\times10^5$ memory locations) is about 250 ft. long and introduces a delay of about 500 nanoseconds. Even more important, a zig-zag sense line of this type introduces considerable signal attenuation. The sense line, in practice, is connected to the primary winding of a step-up transformer and the inductance of the sense line in series with the inductance of the primary act like an inductive voltage divider. The measured inductance of a practical transformer primary winding (this transformer is located in the liquid helium in accordance with usual practice) is $150\times10^{-9}$ henries. The calculated inductance of a 250 ft. long sense line is $3\times10^{-6}$ henries. The percentage of the sense line voltage which develops across the primary winding is $.15\times10^{-6}/3\times10^{-6}+.15\times10^{-6}$ which is approximately five percent of the sense signal generated at the memory cell. The sense signal generated at the memory cell at practical packing densities is itself small and five percent of this is such a small value that its extraction from the noise presents formidable problems.

In the memory system of the present invention, the problem above is avoided. A particular sense winding such as the $s_1$ sense winding on a given plane is quite short, about 4 ft. Accordingly, its distributed inductance is relatively small and a much, much greater percentage of the sense signal developed by the cell appears across the primary winding of the sense transformer. As a matter of fact, as many as four or more such sense windings can be connected in series and connected to the primary winding of a transformer, and the sense signal developed will still be of adequate amplitude to be detected by a sense amplifier.

In the arrangement of the present invention, the *a* drive line has a length dependent upon the number of planes. However, calculations show that in a system consisting of 100 planes, the delay imparted along the *a* line is less than 100 nanoseconds.

As mentioned above, while the assumed prior art memory has the advantage that there are relatively few wires extending from a room temperature environment into the liquid helium, there is excessive heat dissipation because so many of the wires carry current at the same time. In the arrangement of the present invention, while there are many wires extending into the liquid helium, only a small number of these wires carry current at any particular time. The time integral of this current is much, much smaller than the amount of current carried in the prior art arrangement. It is estimated that a commercially available refrigerator having capacity of less than 0.5 watt is more than adequate to cool the present memory to the required temperature and to remove the heat which is generated during the operation of the memory.

In the assumed memory of the prior art, as already mentioned, at least 2044 cryotrons are required per plane. This means that for a system consisting of 100 planes, more than $2\times10^5$ cryotrons are needed. The memory organization of the present invention employs transistor decoders. The total number of transistors required for decoding is less than 300 and the total number of diodes is under 3000.

In addition to all of the above, the location of the decoders of the present system, in a room temperature environment, has eliminated many problems. First, there is no longer the problem of interaction among the address currents and the drive currents at the cryotron trees. The problem of attempting to evaluate cryotron selection trees using as the sensors memory cells which is undesirable and costly, is eliminated. The relatively difficult fabrication problem which is present in attempting to make cryotron trees is eliminated.

In previous systems, if there was an open in the zig-zag sense line, the plane was useless and had to be discarded. In the present system, it is possible to lay down somewhat more sense lines than are actually needed and to discard those that open or otherwise fail during the manufacturing process. In this way, it is possible very substantially to increase the yield of usable planes.

It is advantageous in the system of the present invention to employ an equal number of *a* and *b* lines so that the *a* and *b* decoders may be made symmetrical (may be made to have exactly the same structure). If M is the number of *a* wires. N is the number of *b* wires per plane, and P the number of planes, then this condition is achieved when $PN=M$. The length *d* of a word (the number of bits per word) is $M/N$. To give one example, in a configuration suitable for $512\times512$ bits and having a capacity somewhat larger than that of the example given above: $M=512$ *a* wires; $N=4$ *b* wires per plane; $d=128$ bits/word; $P=128$ planes, whereby the total number of *b* wires for the system ($PN=512$) is equal to the total number of *a* wires for the system.

While for purposes of the present explanation, each memory plane is shown to consist of a single such plane, in practice it is sometimes desirable to mount a number of planes side-by-side. For example, each plane may consist of 16 sections, each having $128\times128$ bits and all sections mounted on a common substrate. Each *a* line, in this case, will pass over the same section of each plane. Each group of *b* lines pass over only a single plane and may be arranged to pass over 2, 4 or more of the sections on a plane.

What is claimed is:

1. A cryoelectric memory system comprising:
a plurality of memory planes;
a plurality of *b* drive lines, at least one group for each plane, each group of lines passing back and forth a plurality of times over its plane; and
a plurality of *a* drive lines, each such *a* line passing over a plurality of memory planes, and each such *a* line crossing each *b* line at a plurality of different locations on each plane.

2. A cryoelectric memory system as set forth in claim 1, further including:

a plurality of persistent current storage elements at each plane, one at each location where an *a* wire crosses a *b* wire; and a plurality of sense lines at each plane, each such sense line being coupled only to the persistent current elements on a plane which store bits of the same significance.

3. A cryoelectric memory system as set forth in claim 1, wherein each sense line comprises a group of persistent current loops connected in series.

4. A cryoelectric memory system comprising:

P memory planes, where P is an integer;

P groups of *b* drive lines, one group for each plane, each group of lines passing back and forth a plurality of times over its plane;

a plurality of *a* drive lines, each such line passing over all memory planes, and each such line crossing each *b* line at a plurality of different locations on each plane;

a plurality of persistent current storage elements at each plane, one at each location where an *a* wire crosses a *b* wire; and a plurality of *a* sense lines at each plane, each such sense line being coupled only to the persistent current elements on a plane which store bits of the same significance.

5. A memory as set forth in claim 4, further including:

a plurality of logic circuits equal in number to the number of sense lines on a single plane, and means coupling to each logic circuit a group of P sense lines, one from each plane, and all sense lines in each group being coupled to persistent current elements which store bits of the same significance.

6. A memory as set forth in claim 3, further including address decoders for the *a* and *b* lines, said decoders being located in a room temperature environment.

7. A memory system as set forth in claim 3, wherein the total number of *a* lines is equal to the total number of *b* lines.

References Cited

UNITED STATES PATENTS

| | | | |
|---|---|---|---|
| 3,264,617 | 8/1966 | Feissel | 340—173.1 |
| 3,373,410 | 3/1968 | Newhouse et al. | 340—173.1 |

BERNARD KONICK, *Primary Examiner.*

JOSEPH F. BREIMAYER, *Assistant Examiner.*

U.S. Cl. X.R.

340—174